Patented May 14, 1929.

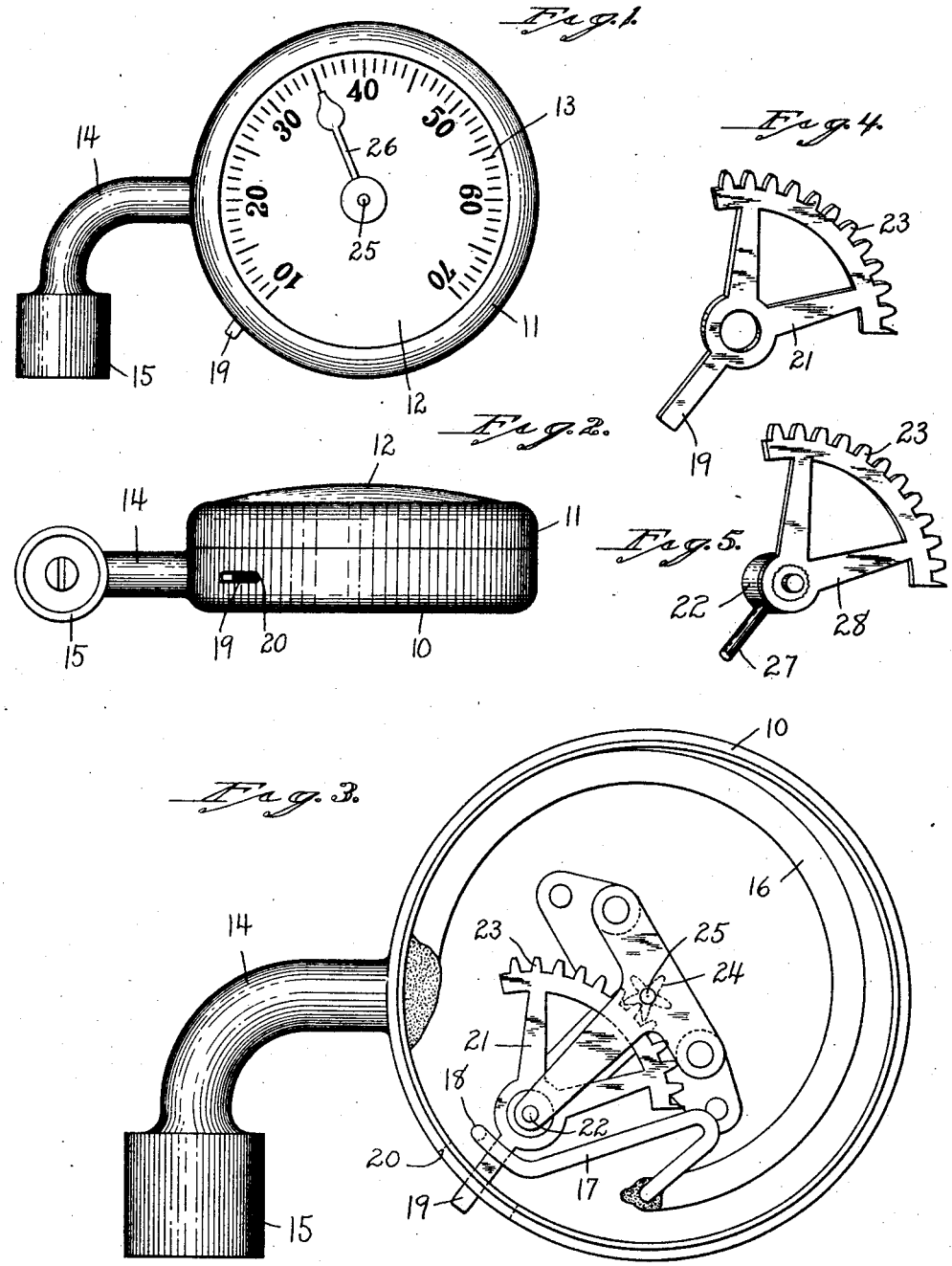

1,713,283

UNITED STATES PATENT OFFICE.

FREDERICK G. JOHNSON, OF NEW HAVEN, CONNECTICUT.

RESETTABLE TIRE TEST GAUGE AND THE LIKE.

Application filed June 2, 1928. Serial No. 282,305.

This invention relates to an improvement in resettable pressure-indicating gauges and particularly to resettable air-pressure gauges for testing automobile tires, though not so limited. The object of this invention is to produce at a low cost for manufacture a simple and reliable resettable pressure-gauge constructed with particular reference to the directness and simplicity of its resetting feature.

With this object in view, my invention consists in a resettable pressure-indicating gauge characterized by its provision with a pivotal operating-member connected to the gauge-pointer for operating the same and formed at its inner end with a series of rack-teeth and provided at its outer end with a finger-piece rigid with it and projecting outward through the gauge-casing, and a pressure-actuated member engaging the said operating-member when moved in one direction for effecting the movement of the gauge-pointer.

My invention further consists in a resettable pressure-indicating gauge characterized as above and having certain details of construction and combinations of parts as will be hereinafter described and particularly recited in the claim.

In the accompanying drawings:

Fig. 1 is a face view of a tire test-gauge embodying my invention;

Fig. 2 is an underside edge view thereof;

Fig. 3 is an enlarged-scale face view thereof with the bezel, dial, and crystal removed from the casing;

Fig. 4 is a detached perspective view of the combined operating-and-resetting member; and Fig. 5 is a corresponding view of another form which the combined operating-and-resetting member may assume.

In carrying out my invention as herein shown in Figs. 1 to 4 inclusive, I employ a cup-shaped gauge-casing 10 carrying a bezel-ring 11 mounting the usual crystal 12 and enclosing the usual dial which is provided with graduations 13. Offsetting from one side of the casing is a curved tubular stem 14 terminating at its outer end in an enlarged head or nipple 15.

Connected to the inner end of the stem 14 as is usual in pressure-gauges is a Bourdon tube 16 having secured to its free end a reversely-looped wire 17 the outer end of which is rearwardly offset as at 18 to engage one side of a finger-piece 19 projecting outward through and playing back and forth in a slot 20 in the casing 10 and forming an integral extension of a combined operating-and-resetting member 21. The member 21 just mentioned is skeletonized, as shown in the drawing, and is mounted for oscillation upon a shaft 22 and has its inner edge formed with a segmental series of gear-teeth 23 meshing into a center-pinion 24 carried by the center-arbor 25 of the gauge, which also mounts at its outer end a pointer 26 sweeping over the graduations 13 of the dial.

When the nipple 15 of the gauge is slipped over the end of a valve-stem so as to permit the air within the tire to flow into the Bourdon tube 16, the same tends, to a limited extent, to straighten out, which moves the wire 17 and causes the offset portion 18 thereof to engage the left side of the integral finger-piece 19 of the combined operating-and-resetting member and hence turns the same counter-clockwise upon its shaft 22 which in turn effects the rotation of the pinion 24, arbor 25 and causes the pointer 26 to register with one of the graduations 13 to indicate the air-pressure of the tire.

As soon as the nipple 15 of the gauge is removed from the tire-stem, the Bourdon tube 16 will be relieved of internal pressure and thus contract to its original form which will cause the offset 18 of the wire 17 carried by the Bourdon tube to ride away from the left-hand side of the finger-piece 19, thus leaving the combined operating-and-resetting member, the pointer, and the connecting parts in the position to which they have been just previously moved by the application of air-pressure to the Bourdon tube. The user of the gauge may thus remove the gauge from the tire-nipple and bring its dial to within easy eye-range and read the pressure indicated by the pointer 26.

Preparatory to making another test, it will be necessary for the user to reset the pointer at or near the zero graduation on the dial. This may be readily effected by moving the integral finger-piece 19 so as to rock the member 21 clockwise which in turn will move the pointer 26 counter-clockwise through the intermediary of the center-pinion 24 and center-arbor 25.

Instead of forming the finger-piece integral with the combined operating-and-resetting member, I may achieve the same functional advantages, though at increased cost, by employing the construction shown in Fig.

5. In this construction the finger-piece is in the form of a pin 27 driven radially into the shaft 22 having staked to it a rack-sector 28, which is adapted to mesh into the center-pinion 24 of the gauge.

I claim:

In a resettable pressure-gauge, the combination with a casing, dial, and pointer thereof; of a pointer-carrying arbor positioned centrally with respect to the dial; a center-pinion carried by the said arbor; a pivotally-mounted combined operating-and-resetting member provided upon one end with a segmental series of rack-teeth meshing into the said center-pinion, and at its other end with a finger-piece projecting through a slot in the said casing; a pressure-distortable member; and lost-motion connection between the said pressure-distortable member and the said operating-and-resetting member; whereby the said operating-and-resetting member may be moved in one direction by the said pressure-distortable member and moved manually in the opposite direction by the said finger-piece.

In testimony whereof, I have signed this specification.

FREDERICK G. JOHNSON.